United States Patent Office 3,081,307
Patented Mar. 12, 1963

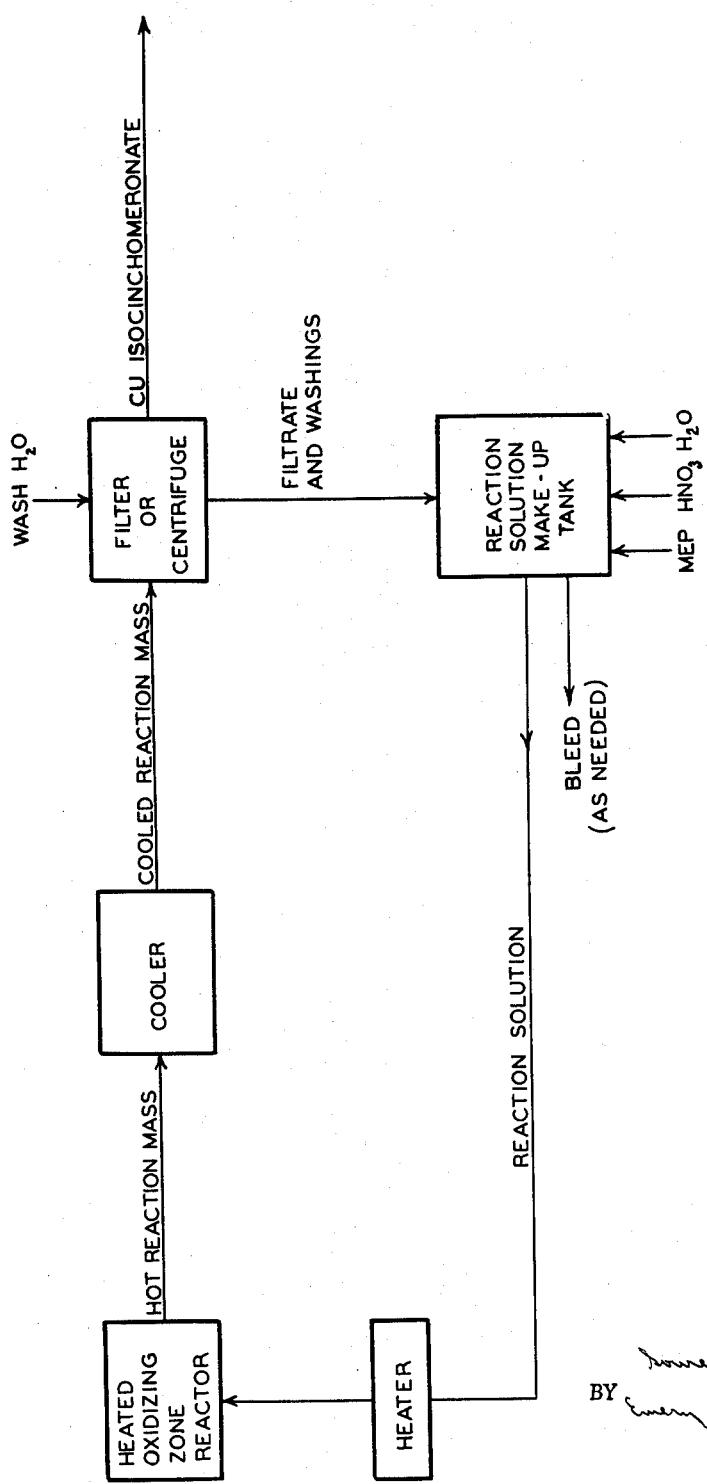

1

3,081,307
PRODUCTION OF COPPER ISOCINCHOMERON-
ATE AND ISOCINCHOMERONIC ACID
Souren Z. Avedikian, 58 Willow Ave., Larchmont, N.Y.
Filed Feb. 10, 1958, Ser. No. 714,280
3 Claims. (Cl. 260—270)

This invention relates to a novel and improved process for the production of copper isocinchomeronate in aqueous medium with relatively dilute nitric acid by the liquid phase oxidation of 5-ethyl-2-methyl pyridine, and is subsequent conversion to isocinchomeronic acid.

Processes disclosed in the prior art have utilized as oxidizing agents nitric and sulfuric acids, nitrogen tetroxide, chlorine, permanganates, manganese dioxide or dichromates. All of these prior processes have one feature in common. The oxidizing reaction has been carried out in a strongly acid medium, for example, with nitric, phosphoric or sulfuric acid. However, the one highly concentrated acid medium that has been used most commonly, and the one which has formed the basis of much of the prior art, is sulfuric acid, usually employed as concentrated sulfuric acid, 60° Bé or higher in concentration. This acid is used as a solvent or reaction medium when the oxidizing agent is nitric acid, sulfuric acid itself, oxides of nitrogen (e.g. nitrogen tetroxide), manganese dioxide or dichromates. When the oxidizing agent is chlorine, the acid medium usually employed is concentrated hydrochloric acid. These oxidizing agents have been used both with and without catalysts.

The oxidizing reaction in such strongly acid mediums takes place at such high velocity that a great deal of heat is liberated over a short period of time. As a result, the temperature of the reaction mixture rises rapidly and vaporization of volatile components of the mixture takes place, and these serve to build up heat and pressure. Cooling of the mixture to keep the reaction within bounds is often necessary. Sometimes, it is difficult to control the reaction from assuming explosive proportions. This is especially true when concentrated nitric acid is used.

Now, I have discovered a way in which the results can be obtained at lower pressures and without the build-up of excessive heat. In fact, under the conditions of my invention, I sometimes supply heat to make the oxidation take place. I carry out the oxidation of compounds containing the pyridine nucleus in an aqueous medium containing a low concentration of nitric acid. The concentration of the nitric acid in my reaction medium is lower than 20% and preferably about 12%, and I maintain constant this concentration of acid and the pyridine compound within the reactor at all times by supplying to the reactor reactants of sufficient concentration.

I prefer to maintain the pH of this reaction medium within a relatively narrow range, between a low of 0, or about minus two-tenths, to a high of about 1.00. These points correspond to a nitric acid concentration of 12%, 19% and 1%, respectively. But once I elect the concentration, I maintain it constant within the reactor at all times.

I may carry out the oxidation of the pyridinic compound in aqueous medium wherein water is the major component of the reaction mixture. When the oxidation takes place in a confined space, the gaseous products of reaction bring about an increase in pressure in the system. At elevated temperatures, water itself has an appreciable vapor pressure. For example, at 284° F. and 482° F.,

2 the vapor pressure of water is about 52 pounds per square inch and 577 pounds per square inch gage, respectively. The total pressure in the system is the sum of the partial pressures of water and the gaseous reaction products. These gaseous reaction products comprise essentially oxides of nitrogen and primarily nitric oxide, NO, resulting from the reduction of the nitric acid by the pyridinic compound. If the pyridinic compound being oxidized contains more than one carbon atom in the side chain as in the case of, for example, nicotine, quinoline, methyl-ethyl pyridine, etc., a second gaseous product of reaction is carbon dioxide, $CO_2$. The pressure contributed by the gaseous products of reaction would then be equal to the sum of the partial pressures of carbon dioxide and of the oxides of nitrogen.

As an alternative to the aqueous medium disclosed above, I may carry out the oxidation in a reaction medium which comprises an alkali nitrate or alkaline earth nitrate containing only a small amount of water. In such a system, I can carry out the oxidation at a pressure which is lower than that in the case of a reaction medium containing a substantial quantity of water. The selection of the nitrate is governed primarily by availability and economic considerations. However, I have found calcium and magnesium nitrates to be the most desirable.

As a result of the use of relatively dilute nitric acid as the oxidizing agent, the formation of by-products has been eliminated. The yields obtained have been quantitative. Virtually 100% of the reacted pyridinic compound has been recoverable as the corresponding dis-carboxylic acid. An altogether unexpected result has been a consumption of nitric acid less than theoretically required for the oxidation of 5-ethyl-2-methyl pyridine to isocinchomeronic acid or to nicotinic acid. Only approximately 80% of that required theoretically has been consumed. The reason for this is not clearly understood, but it is believed that a lower oxidized state of oxides of nitrogen may be one of the products of reaction, e.g., $N_2O$. If this were the case, and nitric acid were capable of being reduced to $N_2O$ under the conditions of my invention, instead of stopping at NO as theoretically expected, the lower consumption of nitric acid can be explained. Time permitting, an attempt will be made to establish the reasons for and to explain the unexpectedly lower consumption of nitric acid observed in the operation of my invention.

In addition, by virtue of the use of dilute nitric acid as both the reaction medium and the oxidizing agent, a novel method of purification of the oxidation product has been obtained. In the prior art, the separation of the oxidation product from the reaction mass has been costly and has offered many difficulties. Neutralization of the acid has required large quantities of basic substances, for example, sodium hydroxide, sodium carbonate, lime, etc., resulting in increased material costs, and difficulty in processing.

It is well known that certain heavy metal salts of the various pyridine carboxylic acids are insoluble in water. For example, copper salts of pyridine carboxylic acids are well known and are employed in separating the pyridine carboxylic acids from the neutralized reaction solution.

In my process 2, 5-pyridine dicarboxylic acid, otherwise known as isocinchomeronic acid, is recovered out of the oxidation solution in the form of its copper salt. I carry out the oxidation in the presence of copper nitrate dissolved in the dilute, aqueous nitric acid solution. As the oxidation proceeds, the copper salt of the pyridine dicarboxylic acid is formed and this copper salt being insoluble in the reaction medium precipitates, producing a slurry of copper isocinchomeronate in the reaction solution. By virtue of this removal of the reaction product from the immediate zone of action, a more nearly pure end-product is obtained.

The advantages above detailed and others resulting from my invention will be more clearly apparent in the following detailed description of the invention.

The drawing, forming a part hereof, is a flow sheet illustrating the production of isocinchomeronic acid in accordance with the preferred embodiment of my invention.

In the preferred embodiment of my invention the reaction solution contains on a weight basis approximately 12% nitric acid, 5% 5-ethyl-2-methyl-pyridine, referred to as "MEP" below, 1% copper and 82% water. The copper content of the reaction solution should be at least sufficient to react with the isocinchomeronic acid resulting from the oxidation of the "MEP" used. Each mole of copper isocinchomeronate requires one atom of copper and two moles of isocinchomeronic acid. I subject this reaction solution, contained in a suitable vessel, to a temperature of approximately 360° to 380° F. This applied heat and gaseous products of reaction bring about an increase in the pressure in the system to approximately 200 to 350 pounds per square inch or higher depending upon the quantity of reactants used and its relation to the volume of the reaction vessel in which the reaction is carried out. It is to be understood that the vessel used must be chemically and physically resistant to the corrosive action of nitric acid and to the pressures employed, respectively.

The oxidation proceeds smoothly and rapidly, forming isocinchomeronic acid. The latter reacts virtually immediately at the temperature and pressure of the reaction to form the copper salt of isocinchomeronic acid, a dark blue, crystalline compound. This copper salt, namely copper isocinchomeronate, precipitates out of the solution in a well-defined crystalline form. Because it is possible to remove this virtually insoluble salt of isocinchomeronic acid from the oxidation zone readily, I can operate my process on a continuous basis.

I can continuously remove, by filtration, or otherwise, as by centrifugation, the crystals of copper isocinchomeronate and return the filtrate containing unreacted dialkyl pyridine and nitric acid to the reaction zone for further reaction. Prior to return of this solution to the oxidation zone, I charge additional quantities of reactants to maintain the concentrations thereof at the indicated desirable levels.

In order to obtain the free isocinchomeronic acid, I suspend the copper salt in water; I heat it to approximately the boiling point of water, and add thereto a basic substance, for example, sodium hydroxide, slightly in excess of the stoichiometric quantity required to convert the copper isocinchomeronate into insoluble copper oxide. As I heat this mixture approximately to boiling, and let it digest, copper is quantitatively precipated in the form of copper oxide, CuO, which under these conditions of operation is brown to black in color. Other basic substances can be used in place of sodium hydroxide; for example, sodium carbonate, potassium mydroxide, potassium carbonate, etc. The isocinchomeronic acid dissolves in the aqueous solution in the form of its sodium salt. It is not necessary that the alkali substance be added to the copper salt suspended in water as the reverse procedure yields an equivalent result. Acidification of this solution of sodium isocinchomeronate produces the free acid.

The following is an example of the above-described operations involving the oxidation of "MEP" to isocinchomeronic acid, its separation from the oxidation mixture in the form of its insoluble copper salt, return of the solution for continued oxidation, and treatment of the copper salt to produce the free isocinchomeronic acids.

To approximately 1300 parts of water I add approximately 350 parts of 62% nitric acid, that is, 217 parts of 100% nitric acid, 90 parts of "MEP" either as the free base or in the form of its nitric acid salt, and 25 parts of copper in the form of copper nitrate. It will be noted that these proportions give a ratio of nitric acid to "MEP" of 2.4 to 1, which is less than the stoichiometric ratio of 3.1 to 1. Upon subjecting this reaction solution to a temperature of 360° to 380° F. (the reaction proceeds at as low as room temperature and temperatures as high as 480° F. are considered satisfactory), copper isocinchomeronate is formed. I cool this slurry of solid copper isocinchomeronate; I separate the copper salt from the solution containing the still unreacted portions of the reactants by filtration or centrifuging; I enrich the filtrate with new "MEP," new nitric acid and new copper (either as new copper nitrate or as copper oxide resulting from the treatment of the copper isocinchomeronate with basic substance) equivalent to the copper contained in the copper isocinchomeronate removed from the reaction mixture. This new and enriched recycle solution is higher in concentration than the reactant solution within the reactor and is supplied to the reactor at a rate which offsets the consumption of reactants and maintains their concentrations in the reactor substantially constant, while sending the copper salt for treatment with the basic substance and subsequent acidification to set free the isocinchomeronic acid.

In the prior art, various concentrations of nitric acid have been used for oxidizing methyl ethyl pyridine. High concentrations have the advantage of rapid production and large production for the size of the equipment available; but these high concentrations have the disadvantage that they are hazardous, there being both risk of explosion and a high corrosion rate for the equipment. Low concentrations of acid are safer to use, prevent corrosion and make the operation easier to control. However, low concentrations of acid have had the disadvantage of requiring excessively long reaction time and a much larger investment in equipment for the same quantity of production. Where time is saved by cutting off the the slow end of the reaction period, there is a reduction in yield and waste of reactants. This invention obtains all of the advantages of using dilute nitric acid to oxidize the methyl ethyl pyridine and at the same time obtains the high velocity of the reaction which was formerly obtained only with high and hazardous nitric acid concentrations.

By using the continuous process of the invention in the oxidation of pyridine compounds, I make two important changes in the chemical process as compared to the batch processes formerly used.

The first of these changes is that by withdrawing the reacted materials from the zone of reaction during the reaction, and replenishing the zone with fresh reactants and maintaining the concentration of the reactants close to their original concentration as above described, I maintain the production rate substantially constant as compared to the falling and asymtotic production curve met with in batch processes where concentrations become progressively lower.

The second and more subtle change in the chemical reaction is of particular significance with pyridine compounds. By increasing the concentration of the pyridine compound so that there is an excess of the pyridine compound over and above the amount with which the acid will react, a very large increase in the velocity of reaction is obtained which offsets the effect of utilizing low concentrations of nitric acid, while still retaining the advantages of the low concentration of acid.

It is important to note that the concentration of the nitric acid is not directly related to the ratio of acid to pyridine compound. The system includes water, nitric acid, and pyridine compound (omitting for this discussion the copper salts or other special ingredients). The amount of water present determines the concentration of the nitric acid; but the ratio of acid to pyridine compound depends upon how much of the dilute acid is used; that is, it depends upon the total weight of acid considered as a 100% concentration equivalent.

This feature whereby I increase the concentration of the pyridine compound in the solution above the amount with which the acid will react (i.e., the stoichiometric ratio), could not be used in a batch process. The reason for this is that the total amount of acid present in the batch would be reacted, leaving an excess of pyridine compound which would then undergo side reactions producing by-products which would be difficult or impossible to remove from the final product.

To approximately 1000 parts of water I add 100 parts of copper isocinchomeronate and I heat it to approximately from 175° to 212° F. To this mixture I add 50 parts of sodium hydroxide in the form of a 50% solution in water. I heat the entire mass to nearly 212° F. and digest it for a period of time which may vary from 15 minutes to an hour, sufficient to bring about the complete decomposition of the copper salt and the formation of copper oxide and sodium isocinchomeronate, quantitatively. The pH of this mixture is preferably maintained between 9 and 11.5. I separate the copper oxide precipitate from the solution by filtration or other equivalent method; I wash the filter cake with additional water to remove as much of the soluble components of the cake as possible, and I treat the resulting clear filtrate containing the washings, with an acid, for example nitric, sulfuric, or hydrochloric acid. Upon reaching a pH of approximately 2.5, isocinchomeronic acid begins to precipitate out of the solution in a white, crystalline form. This precipitation can be carried to as low a pH as 1 and lower without danger of forming the inorganic acid salt of isocinchomeronic acid. After separation of this compound from the reaction liquor by filtration or equivalent procedure, and washing the cake to remove adhering reaction solution, it can be dried to the anhydrous state. It will then be suitable for use in any application for which isocinchomeronic acid may be specified. One such use is its decarboxylation to nicotinic acid.

Isocinchomeronic acid is the common name for 2,5-pyridine dicarboxylic acid. It is well known that upon application of heat in acid, neutral and alkaline mediums, this compound will lose one molecule of carbon dioxide and will yield nicotinic acid. Heretofore, the yields upon decarboxylation under acid conditions as practiced in the prior art, have been considerably lower than those reported for either neutral or alkaline medium. Now, I have found that if the decarboxylation is carried out in the dilute acid medium of my invention and at the temperatures of the preferred embodiment of my invention or somewhat higher, approximately 360° to 400° F., virtually quantitative yields of nicotinic acid are recovered from the decarboxylation of isocinchomeronic acid. Specifically, I have decarboxylated 240 parts of isocinchomeronic acid suspended in approximately 1400 parts of nitric acid having an acid concentration of 1 to 12% when titrated and calculated as nitric acid, and have obtained approximately 175 parts of nicotinic acid by analysis. I have also found that by increasing the quantity of heat applied and operating at a higher temperature, I can decarboxylate insoluble salts of isocinchomeronic acid, such as its copper salt, or its calcium salt suspended in an aqueous medium.

The reaction discussed above may be theoretically represented by the following equations.

For the oxidation of "MEP" to produce isocinchomeronic acid and formation of its copper salt when copper is added to the reaction solution, Equations 1 and 2 represent the reactions involved.

(1) 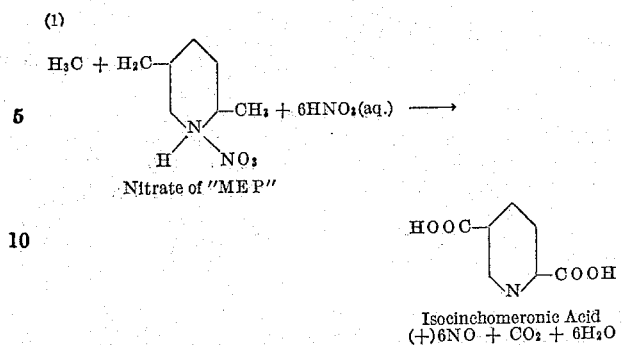
Nitrate of "MEP"

(2) 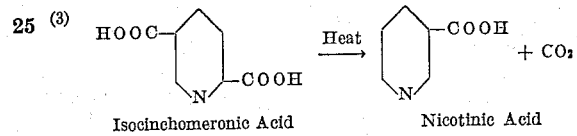

For the decarboxylation of isocinchomeronic acid to nicotinic acid, Equation 3 represents the reaction involved in an aqueous medium.

(3) 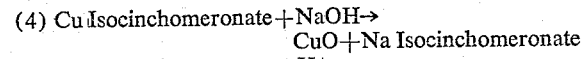

Isocinchomeronic Acid      Nicotinic Acid

For the recovery of isocinchomeronic acid from its copper salt, Equations 4 and 5 in aqueous medium.

(4) Cu Isocinchomeronate+NaOH→
                         CuO+Na Isocinchomeronate
(5) Na Isocinchomeronate+H+→
                         Isocinchomeronic Acid+Na+

I have found that lead, mercury and silver, in addition to copper, function in a similar manner to give insoluble compound of the pyridine carboxylic acids.

The results described for the aqueous medium are obtained also when the aqueous medium is replaced with primarily a nitrate salt medium. The nitrate may be selected from a list including alkali nitrates, such as sodium and potassium nitrates, and alkaline earth nitrates such as calcium and magnesium nitrates. The medium, in addition to any one or a mixture of two or more of the above-listed nitrates, contains a quantity of water such that it has a boiling point of about 250° to 400° F. As in the case of the aqueous medium, I carry out the oxidation of the pyridinic compound to give the corresponding pyridine carboxylic acid with dilute nitric acid wherein the concentration of the nitric acid in the reaction mixture is less than 20% by weight. The concentration of the pyridinic compound may vary satisfactorily from between 1 and 2% to 10% or higher. The percentage of nitrate salt in this reaction medium may be as high as 80%.

Except for the modification which includes the substitution of metallic nitrates for the aqueous medium, the conditions and operations described for the aqueous medium in the preceding disclosures apply to the process wherein the reaction medium is primarily composed of metallic nitrates. In order to form the copper salt of isocinchomeronic acid, the alkali metal and the alkaline earth metal nitrates are supplemented with copper nitrate.

While the method has been described in detail, it will be understood that various modifications in procedure, additions of operation, concentrations of reactants may be introduced without departing from the scope of the invention and it is intended that the specific examples contained in the above description shall be interpreted as illustrative. Various changes and modifications can be made without departing from the invention as defined in the claims.

This application is a continuation-in-part of my copending application Serial No. 457,617, filed September 22, 1954 and now abandoned.

What is claimed is:

1. In the manufacture of copper isocinchomeronate by reacting a mixture of 5-ethyl-2-methyl pyridine, nitric acid and copper in a reaction vessel under heat and pressure to produce a precipitate of copper isocinchomeronate, the improvement which comprises reducing the hazard in the use of nitric acid by using the acid at a concentration below 20%, increasing the velocity of the reaction by using a quantity of 5-ethyl-2-methyl pyridine substantially in excess of the stoichiometric ratio of the acid to 5-ethyl-2-methyl pyridine, preventing the completion of the reaction between the acid, the copper and the excess of 5-ethyl-2-methyl pyridine by withdrawing a substantially continuous stream of the reactants from the zone of reaction and with the copper isocinchomeronate carried in said stream, removing the copper isocinchomeronate from said stream, returning the stream to the zone of reaction, and maintaining the ratio of excess 5-ethyl-2-methyl pyridine to acid substantially constant in the reaction vessel at all times by adding to the stream, as it returns to the zone of reaction, fresh quantities of 5-ethyl-2-methyl pyridine, copper and nitric acid in their stoichiometric ratio.

2. The method described in claim 1 and in which the continuously withdrawn stream of solution from the reactor vessel is cooled after leaving the reactor vessel to precipitate copper isocinchomeronate.

3. The method described in claim 1 and in which the ratio of net nitric acid to the 5-ethyl-2-methyl pyridine in the reactor vessel is approximately 2.4 to 1.

References Cited in the file of this patent

UNITED STATES PATENTS

| | | |
|---|---|---|
| 2,295,870 | Seibert et al. | Sept. 15, 1942 |
| 2,381,794 | Weijlard et al. | Aug. 7, 1945 |
| 2,524,957 | Burrows et al. | Oct. 10, 1950 |
| 2,608,556 | Kalberg | Aug. 26, 1952 |
| 2,657,207 | Herring | Oct. 27, 1953 |
| 2,702,802 | Aries | Feb. 22, 1955 |
| 2,708,196 | Aries et al. | May 10, 1955 |
| 2,755,280 | Feigin et al. | July 17, 1956 |